United States Patent
Norling

(10) Patent No.: US 8,714,421 B2
(45) Date of Patent: May 6, 2014

(54) WEARABLE ASSEMBLY FOR CARRYING DEVICES

(76) Inventor: Phil Norling, Villa Park, CA (US)

( * ) Notice: Subject to any disclaimer, the term of this patent is extended or adjusted under 35 U.S.C. 154(b) by 530 days.

(21) Appl. No.: 12/958,317

(22) Filed: Dec. 1, 2010

(65) Prior Publication Data

US 2012/0138647 A1    Jun. 7, 2012

(51) Int. Cl.
*A45F 5/00*     (2006.01)
*A45C 13/30*    (2006.01)

(52) U.S. Cl.
USPC .......................... 224/197; 224/221; 224/930

(58) Field of Classification Search
USPC ......... 224/164, 175, 176, 178, 219, 221, 222, 224/267, 930, 197; 24/19, 20 R, 20 S, 20 TT, 24/68 J; 63/3, 3.2, 41
See application file for complete search history.

(56) References Cited

U.S. PATENT DOCUMENTS

| | | | |
|---|---|---|---|
| 1,997,836 A | | 4/1935 | Steinberg |
| 2,534,200 A | | 12/1950 | Hickey |
| 3,890,801 A | * | 6/1975 | Newman ...................... 63/15.65 |
| 4,178,751 A | * | 12/1979 | Liautaud ....................... 368/281 |
| 5,930,872 A | * | 8/1999 | McBride et al. ................... 24/19 |
| 6,688,139 B2 | | 2/2004 | Tschetter |
| 7,156,230 B2 | * | 1/2007 | Gyongyosi et al. ........... 206/338 |
| 7,618,260 B2 | | 11/2009 | Daniel et al. |
| 7,942,293 B2 | * | 5/2011 | Lawrence et al. ............. 224/218 |
| 2006/0113338 A1 | * | 6/2006 | Harrison, Jr. .................. 224/219 |
| 2007/0261703 A1 | | 11/2007 | Gheneva et al. |
| 2008/0017678 A1 | | 1/2008 | Anderson et al. |
| 2009/0061958 A1 | | 3/2009 | Osgood |
| 2009/0321483 A1 | * | 12/2009 | Froloff .......................... 224/267 |
| 2010/0155438 A1 | | 6/2010 | Halpin |
| 2011/0303710 A1 | * | 12/2011 | Yu ................................. 224/219 |

OTHER PUBLICATIONS

Internet printout of Apple Store commercially available wristbands.
Internet printout of Apple Store commercially available wristband—Nike Sport Armband for iPod nano (5th Gen.).

* cited by examiner

*Primary Examiner* — Justin Larson
(74) *Attorney, Agent, or Firm* — Myers Andras LLP; Joseph C. Andras

(57) ABSTRACT

A wearable assembly for carrying a device is disclosed. The wearable assembly has a plurality of adjacent staggered bands in which each band is engaged with at least one adjacent band such that the bands slide relative to the adjacent band. The wearable assembly may have a locking mechanism for securing the bands in place, and a platform for holding a device. The user may then move and position the platform that holds the electronic device relative to the bands, and may rotate and swivel the electronic device to a desired angle of orientation.

17 Claims, 19 Drawing Sheets

FIG. 9A  FIG. 9D

WEARABLE ASSEMBLY FOR CARRYING DEVICES

BACKGROUND OF THE INVENTION

1. Field of the Invention

The present invention relates generally to wearable assemblies for carrying devices or objects. More particularly, the invention is directed to wearable assemblies that are configured for holding and carrying electronic devices.

2. Description of the Related Art

Portable media players have become commonplace over the last several years. Modern media players and cellular telephones are capable of providing audio and video content stored internally, and many enable users to access content from the Internet.

Consumers typically place their media players within protective pouches and carry their players in pockets or purses. Consumers may also place media players in an article of apparel such as wristbands or armbands to provide the consumers with more convenient access to the devices. However, these approaches do not provide the flexibility or comfort necessary for consumers to enjoy the full capabilities of the devices.

Accordingly, a need exists for improving wearable assemblies that hold and carry devices.

SUMMARY OF THE INVENTION

In one aspect, the invention is a wearable assembly for carrying a device comprising a first band having a length substantially transverse to an axis, where one end of the first band is located near the axis and the opposing end of the first band extends away in a first direction. A second band is positioned adjacent to the first band, where one end of the second band is located near the axis and coupled to the one end of the first band and the opposing end of the second band extends away in a second direction that is opposite to the first direction. A third band is positioned adjacent to the second band, where one end of the third band is located near the axis and coupled to said one end of the second band, wherein the opposing end of the third band extends away in the first direction. A fourth band is positioned adjacent to the third band, where one end of the fourth band is located near the axis and coupled to said one end of the third band, wherein the opposing end of the fourth band extends away in the second direction. Each band of the first band, the second band, the third band, and the fourth band further comprises a track along the length of the outer surface of each band, a notched channel along the length of each band, a ridge along the length of the top surface of each band, and a groove along the length of the bottom surface of each band, wherein the groove is configured for engaging and slidably coupling the ridge of an adjacent band.

In a preferred embodiment of the wearable assembly, wearable assembly has a ratcheting mechanism configured for locking the opposing ends of the first, second, third, and fourth bands at a desired position, where the ratcheting mechanism having a first pawl configured for engaging the notched channel of the first band, a second pawl configured for engaging the notched channel of the second band, a third pawl configured for engaging the notched channel of the third band, and a fourth pawl configured for engaging the notched channel of the fourth band. The platform is preferably configured for slidably coupling and locking in place to one or more of the track of the first band, the track of the second band, the track of the third band, and the track of the fourth band. The platform further comprises a plurality of arms configured for engaging and locking the platform to one or more of the track of the first band, the track of the second band, the track of the third band, and the track of the fourth band. The platform is further configured for coupling with a device. The platform is preferably configured for rotating the device with respect to three orthogonal axes. The platform further comprises a ball and socket assembly configured for rotating the device with respect to the three orthogonal axes. The ball and socket assembly further comprises a device coupling mechanism that has a plurality of wheels configured for rolling along the perimeter of the device and a locking pin mechanism configured for operating in three modes, where a first mode allows the device coupling mechanism to decouple from the device, where a second mode allows the device coupling mechanism to attach to and freely slide along the perimeter of the device, and a third mode that securely attaches the device coupling mechanism to the device. Each band of the first band, the second band, the third band, and the fourth band preferably further comprises an internal cavity having the notched channel. Each band of the first band, the second band, the third band, and the fourth band further comprises an inner track along the length of the inner surface having the notched channel.

In another aspect, the present invention is a wearable assembly for carrying a device comprising a first band having a length substantially transverse to an axis, where one end of the first band is located near the axis and the opposing end of the first band extends away in a first direction. A second band is positioned adjacent to the first band, where one end of the second band is located near the axis and coupled to said one end of the first band and the opposing end of the second band extends away in a second direction that is opposite to the first direction. A third band is positioned adjacent to the second band, wherein one end of the third band is located near the axis and coupled to said one end of the second band, where the opposing end of the third band extends away in the first direction. A fourth band is positioned adjacent to the third band, where one end of the fourth band is located near the axis and coupled to said one end of the third band, wherein the opposing end of the fourth band extends away in the second direction. The opposing ends of the first, second, third, and fourth bands are configured for engaging and slidably coupling with respect to adjacent bands.

In a preferred embodiment, the wearable assembly has a mechanism configured for locking the opposing ends of the first, second, third, and fourth bands. The mechanism configured for locking the opposing ends of the first, second, third, and fourth bands further comprises a mechanism configured for pressing the first band toward the fourth band such that the first, second, third, and fourth bands are locked in a desired position. The wearable assembly has a first band having a first notched channel along the length of the first band. The second band has a second notched channel along the length of the second band. The third band has a third notched channel along the length of the third band, and the fourth band has a fourth notched channel along the length of the fourth band. The mechanism for locking preferably has a locking mechanism having a first pawl configured for engaging the first notched channel, a second pawl configured for engaging the second notched channel, a third pawl configured for engaging the third notched channel; and, a fourth pawl configured for engaging the fourth notched channel. The platform is configured for slidably coupling and locking in place to one or more of said first, second, third, and fourth bands. The wearable assembly preferably has a first band further comprises a first track on the outer surface of the first band, the second band further comprises a second track on the outer surface of the second band, the third band further comprises a third track on the outer surface of the third band, and the fourth band further comprises a fourth track on the outer surface of the fourth band. The platform further comprises a plurality of arms configured for engaging and locking the platform on one or more of the first, second, third, and fourth tracks. The platform is preferably further configured for coupling with a device. The platform is further configured for rotating the device with respect to three orthogonal axes. The platform further comprises a ball and socket assembly configured for rotating the device with respect to the three orthogonal axes. The ball and socket assembly further comprises a device coupling mechanism that has a plurality of wheels configured for rolling along the perimeter of the device and a locking pin mechanism configured for operating in three modes, where a first mode allows the device coupling mechanism to decouple from the device, where a second mode allows the device coupling mechanism to attach to and freely slide along the perimeter of the device, and a third mode that securely attaches the device coupling mechanism to the device.

In another aspect, the present invention is a wearable assembly for carrying a device comprising at least one band of a first type having a length substantially transverse to an axis, where one end of said at least one band of a first type is located near the axis and the opposing end of said at least one band of a first type extends away in a first direction. At least one band of a second type having a length substantially transverse to the axis, where one end of said at least one band of a second type is coupled to an adjacent band of the first type and the opposing end of said at least one band of the second type extends away in a second direction that is opposite to the first direction. The opposing ends of said at least one band of the first type and said at least one band of the second type are configured for engaging and slidably coupling with respect to adjacent bands.

In a preferred embodiment, the wearable assembly has a mechanism configured for locking the opposing ends of said at least one band of the first type and said at least one band of the second type, and, has a platform configured for slidably coupling and locking in place to one or more of said at least one band of the first type and said at least one band of the second type, where the platform is further configured for coupling with a device.

These and other features and advantages of the invention will become more apparent with a description of preferred embodiments in reference to the associated drawings.

DESCRIPTION OF THE DRAWINGS

FIGS. 9A-9D illustrate an electronic device carrier in an embodiment of the present invention.

DETAILED DESCRIPTION

In accordance with at least one embodiment of the present invention, a wearable assembly for carrying a device is presented having four flexible adjacent bands, a locking mechanism, and a platform that holds an electronic device. Each of the four bands are engaged with at least one adjacent band such that the individual bands slide relative to the adjacent band, but are sufficiently coupled together to prevent the bands from separating apart in a direction transverse to the length of the bands. A user may place the assembly on their wrist or arm by expanding the bands, placing their hand though the assembly, and then closing the assembly. The locking mechanism secures the bands at the desired position. The user may then move and position the platform that holds the electronic device relative to the bands, and may rotate and swivel the electronic device to a desired angle of orientation.

A wearable assembly may be in form of a wristband, an armband, or as an assembly being wearable on a limb of a user.

Figure 1A:
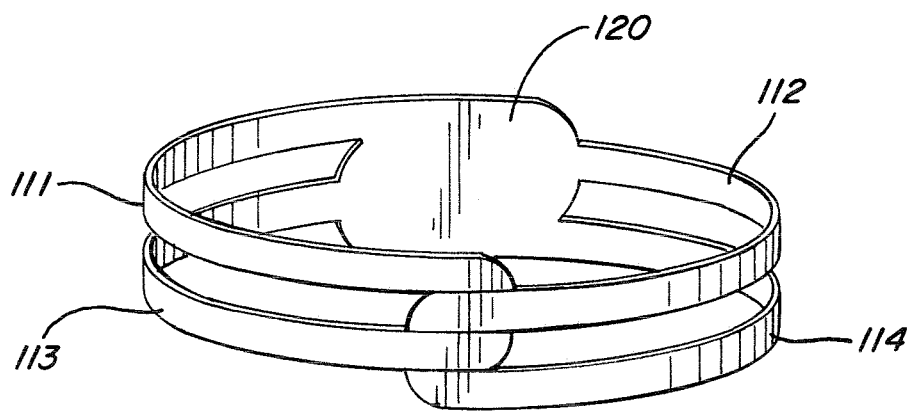
FIG. 1A is a perspective view of an embodiment of a wearable assembly having four adjacent staggered bands in an open position.

FIG. 1A is a perspective view of an embodiment of a wearable assembly having four adjacent staggered bands in an open position. First Band 111 has a length substantially transverse to an axis that is substantially parallel with the direction of a user's arm. One end of First Band 111 is affixed to the Fused Section 120 and the opposing end of First Band extends away in a first direction (i.e., to the left in this example). Second Band 112 is positioned adjacent to First Band 111. One end of Second Band 112 is also affixed to Fused Section 120 and the opposing end of Second Band 112 extends away in a second direction that is opposite to the first direction (i.e., to the right in this example). Likewise, Third Band 113 is positioned adjacent to Second Band 112, and Fourth Band 114 is positioned adjacent to Third Band 113. One end of Third Band 113 and Fourth Band 114 are affixed to Fused Section 120, and the opposing ends extends to the left and right respectively. The opposing ends of the First Band 111, Second Band 112, Third Band 113, and Fourth Band 114 engage and are configured for sliding with respect to adjacent bands. When the opposing ends of the bands are engaged, the adjacent bands are sufficiently mated to prevent the adjacent bands from separating apart in the direction transverse to the length of the bands. As a result, all four of the bands will have a similar shape and dimension when the wearable assembly is expanded or contracted. The bands may be fabricated from a variety of flexible materials including plastic, nylon, and metal.

Figure 1B:
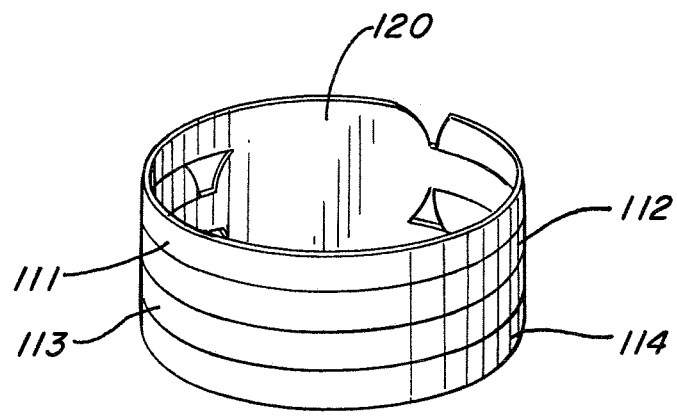
FIG. 1B is a perspective view of an embodiment of the wearable assembly in a closed position.

FIG. 1B is a perspective view of an embodiment of the wearable assembly in a closed position and illustrates that the bands are configured to freely slide with respect to adjacent bands. For example, First Band 111 slides relative to Second Band 112 to enable the wearable assembly to expand or contract while maintaining the same shape for both First Band 111 and Second Band 112. Moreover, as First Band 111 follows the same contour as that of Second Band 112 when being contracted, the wearable assembly does not have flaps extending from the wearable assembly. In one or more embodiments, the wearable assembly may be used as a watchband or a jewelry bracelet. In an embodiment, the wearable assembly could be worn over the sleeves of a jacket. A wearable assembly may be put on and taken off when the user is wearing gloves, for example. In an embodiment, antennae and sensors may be attached to, or formed integral to, the wearable assembly.

Figure 1C:
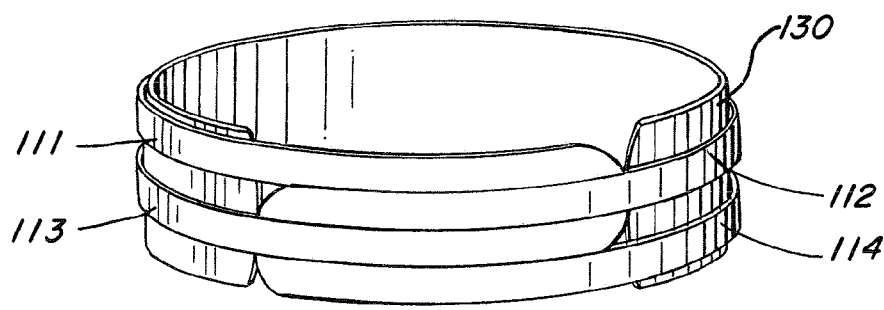
FIG. 1C is a perspective view of an embodiment of the wearable assembly having a second fused section.

FIG. 1C is a perspective view of an embodiment of the wearable assembly having Second Fused Section 130, which may allow cushions, pads, and sensors to placed on the inner surfaces. In an embodiment, Second Fused Section 130 may be much wider than Fused Section 120 which provides enhanced stability for the wearable assembly when fully enlarged.

Figure 1D:
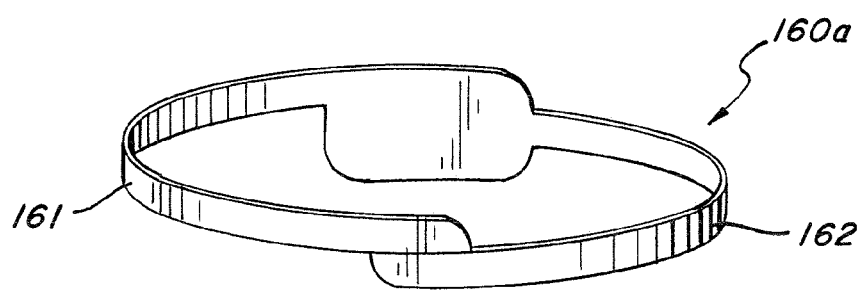
FIG. 1D are perspective views of embodiments having two or more bands.
Figure 1D:
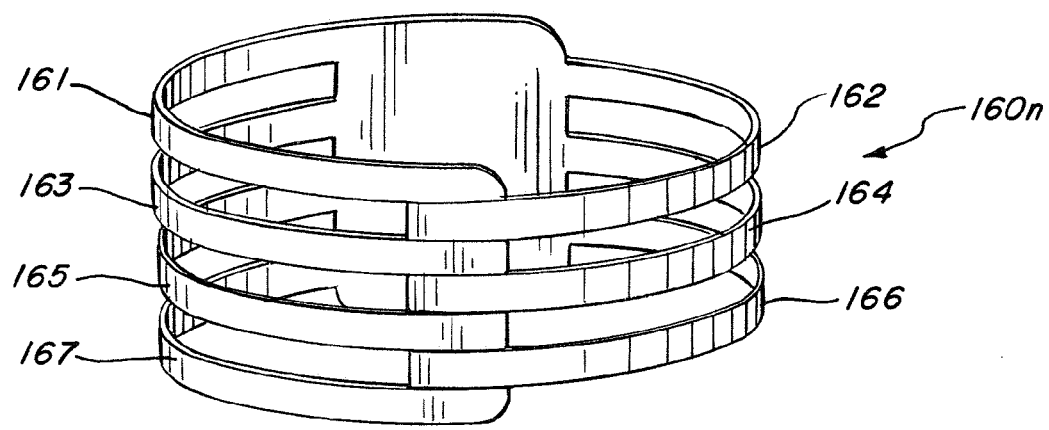

As depicted in FIG. 1D, in one or more embodiments, wearable assemblies may have two or more bands. For example, Wearable Assembly 160a has two bands depicted as Bands 161 and 162. Wearable Assembly 160n has seven bands depicted as Bands 161 through 167. In an embodiment, a wearable assembly for carrying a device may have at least one band of a first type (i.e., Bands 161, 163, and 165, etc.) having a length substantially transverse to an axis, where one end of said at least one band of a first type is located near the axis and the opposing end of said at least one band of a first type extends away in a first direction (i.e., to the left in this example). The wearable assembly may have at least one band of a second type (i.e., Bands 162, 164, and 166, etc.) having a length substantially transverse to the axis, where one end of said at least one band of a second type is coupled to an adjacent band of the first type and the opposing end of said at least one band of the second type extends away in a second direction that is opposite to the first direction (i.e., to the right in this example). The opposing ends of said at least one band of the first type and said at least one band of the second type are configured for engaging and slidably coupling with respect to adjacent bands. In an embodiment, wearable assemblies may have "n" number of bands, where n is an integer greater than or equal to two.

Figure 2A:
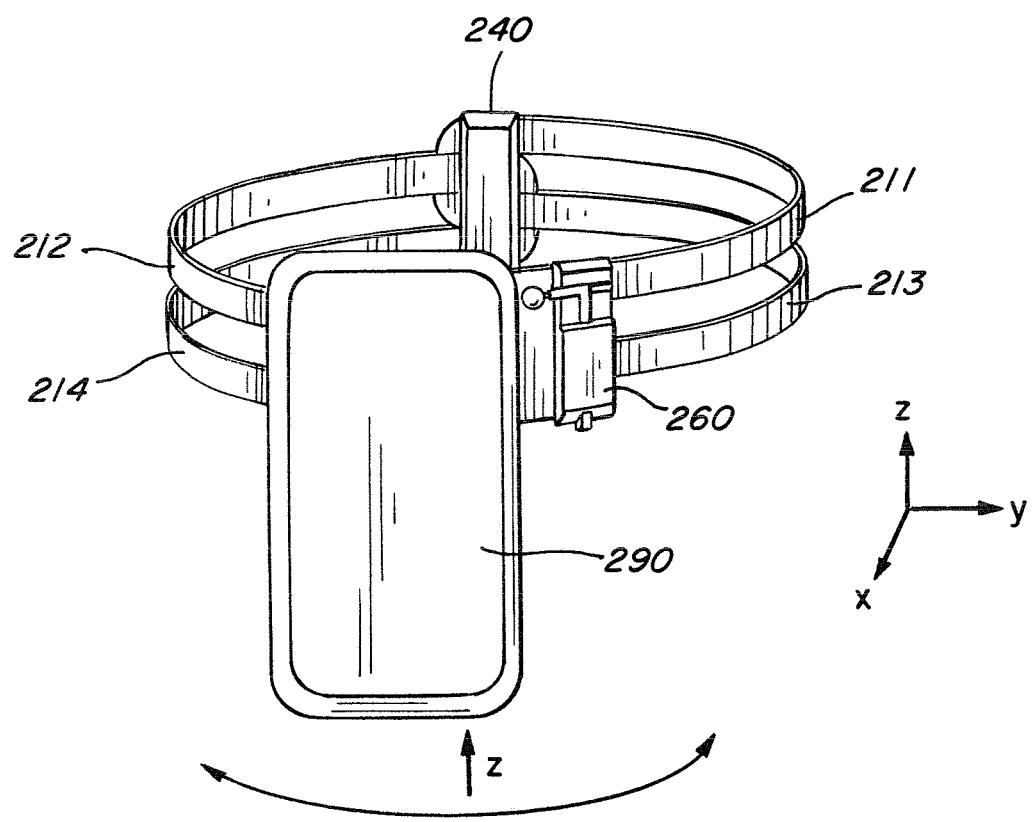
FIG. 2A is a perspective view of an embodiment of a wearable assembly having a locking mechanism and a platform coupled to an electronic device.

FIG. 2A illustrates an embodiment of a wearable assembly having Locking Mechanism 240 and Platform 260 coupled to Electronic Device 290. Locking Mechanism 240 is configured for locking the opposing ends of First Band 211, Second Band 212, Third Band 213, and Fourth Band 214. Platform 260 is attached to one or more of the bands 211-214. Locking Mechanism 240 locks the bands together and allows the user to control the diameter of the bands. Platform 260 is configured to slide along the length of the bands and lock at the desired location. Platform 260 is coupled to Electronic Device 290 such that Electronic Device 290 may slide along the z-axis which is substantially parallel with the direction of a user's arm. Platform 260 may be readily removed from the bands. Platform 260 may also remain attached and move along the bands though the range of diameters of the bands. Platform 260 enables a user to move Electronic Device 290 to a variety of different positions and orientations.

In an embodiment, the bands are fused together at one end and the opposing ends of the bands slide past each other in a way that determines the diameter of the bands. The user places the open band on the wrist of one hand and closes the bands by closing his other hand around the bands. By pushing a button on the locking mechanism, the bands are released and the bands spring to the open position. When open, the diameter of the bands allow the widest part of a user's hand to pass though. When closed, the smaller diameter of the bands allows it to fit snugly around the wrist.

Cushions may be placed on the inner surfaces of the bands. These cushions may be placed near the fused section or on the inner surface of the locking mechanism. These cushions make the wearable assembly comfortable for many wrist sizes and shapes.

Figure 2B:
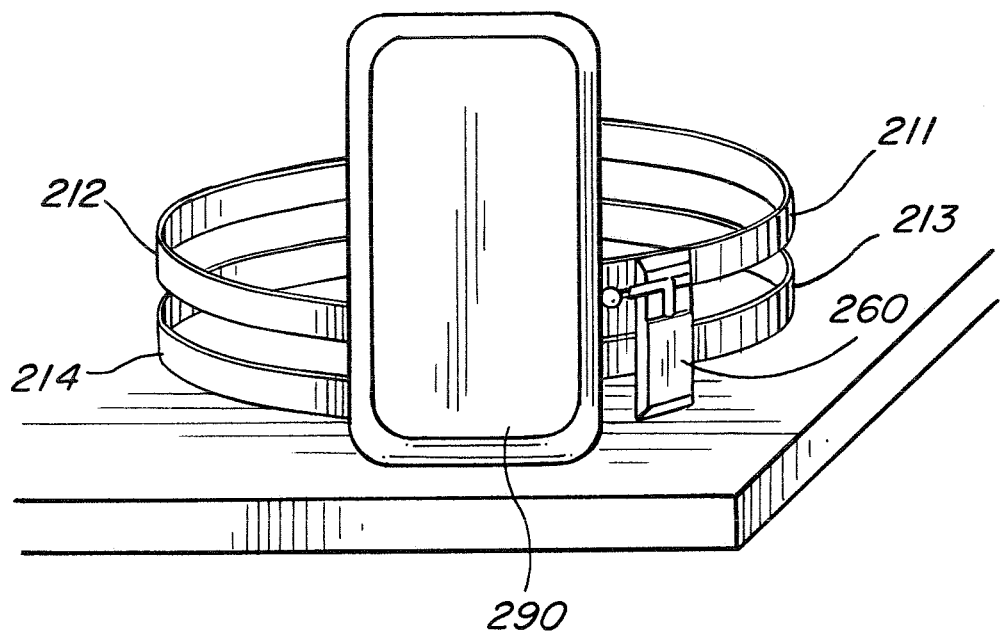
FIG. 2B is a perspective view of an embodiment of the invention which enables the electronic device to be placed on a flat surface.

FIG. 2B is a perspective view of an embodiment of the invention which enables Electronic Device 290 to be placed on a surface. In an embodiment of the invention, the wearable assembly acts as a stand by providing mechanical support to Electronic Device 290.

Figure 2C:
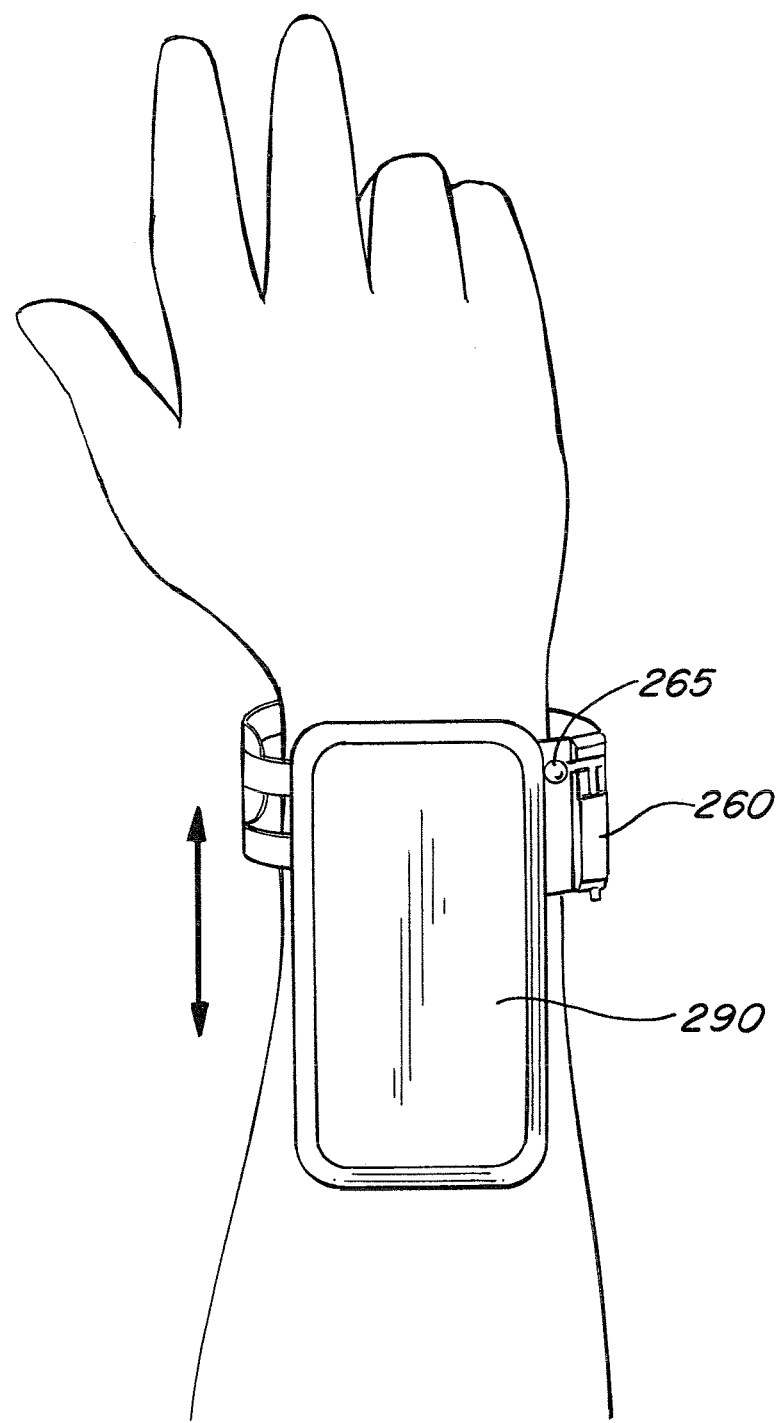
FIG. 2C illustrates that the electronic device coupled to the wearable assembly may slide upward and downward with respect to the user's arm.

FIG. 2C illustrates that Electronic Device 290 is coupled to Platform 260 via Connection Device 265, which allows Electronic Device 290 to move upward or downward along the length of a user's arm.

Figure 2D:
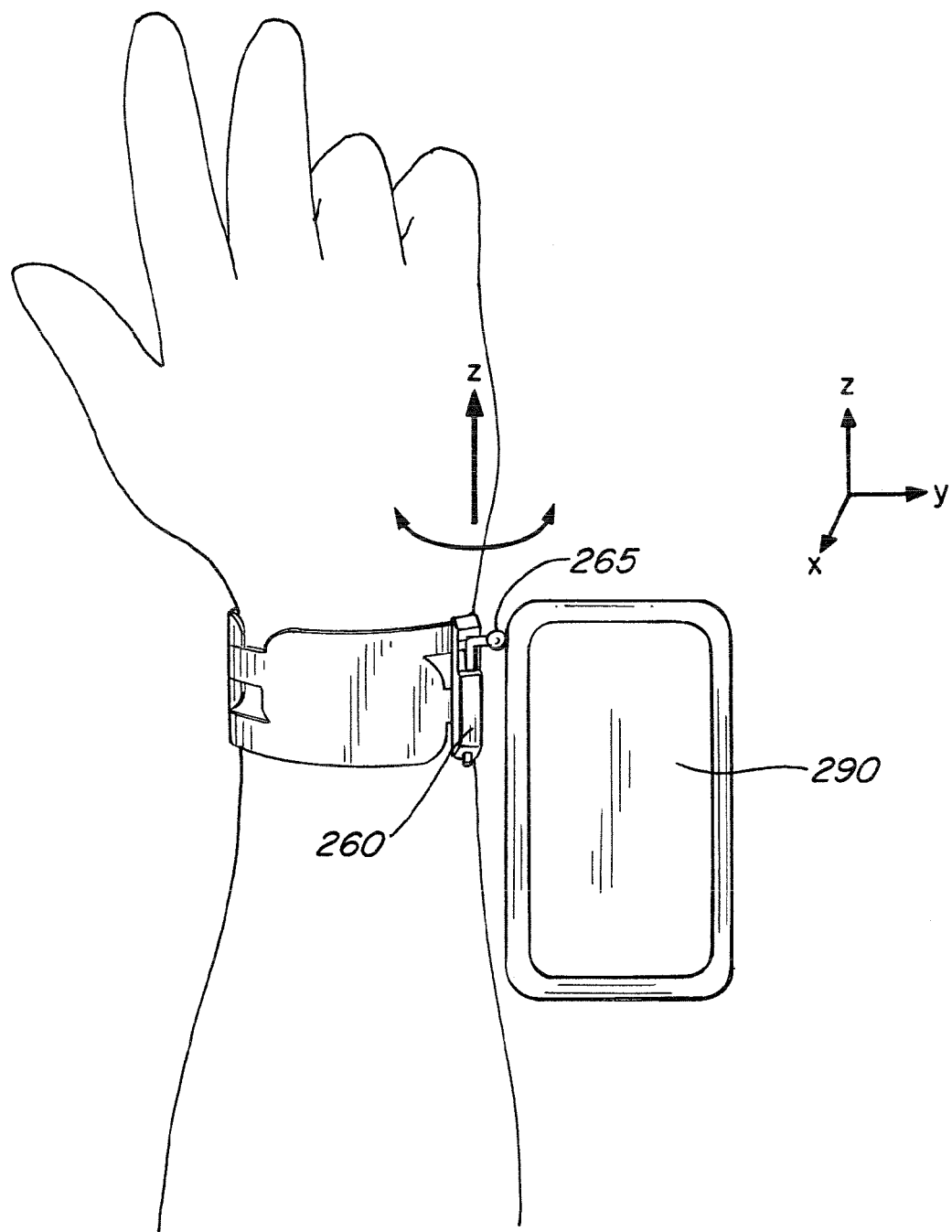
FIG. 2D illustrates that the electronic device coupled to a wearable assembly may swivel with respect to the z-axis (i.e., substantially the direction of the user's arm) in an embodiment of the invention.

FIG. 2D illustrates that Electronic Device 290 is coupled to Platform 290 via a connection Device 265 such that Electronic Device 290 may swivel with respect to the z-axis (i.e., the axis substantially parallel with the direction of the user's arm) in an embodiment of the invention. A user may swivel Electronic Device 290 for reducing glare or enhancing the quality of the video display for example.

Figure 2E:
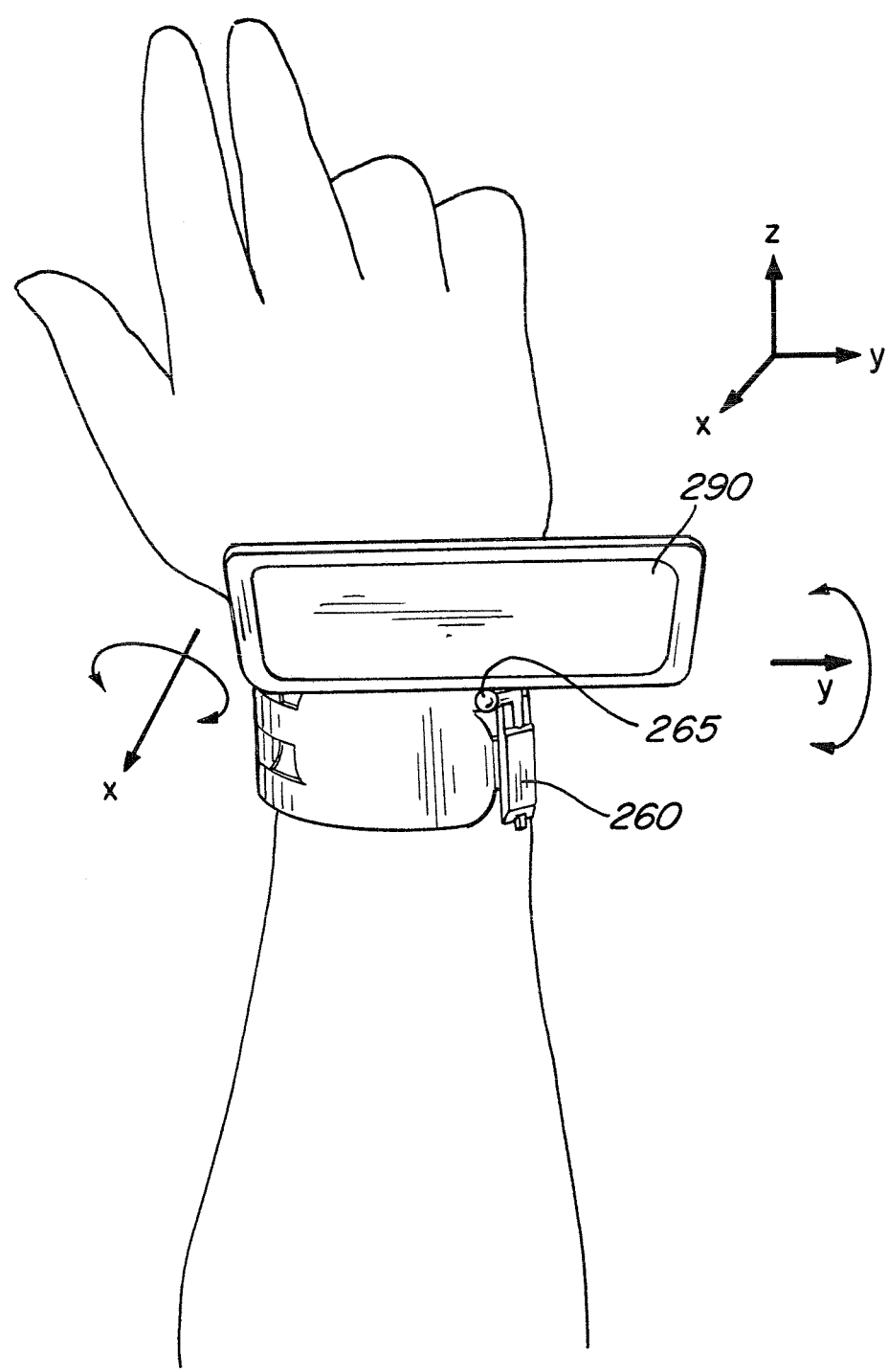
FIG. 2E illustrates that the electronic device coupled to the wearable assembly may swivel with respect to the x-axis and y-axis.

FIG. 2E illustrates that Electronic Device 290 coupled to Platform 260 via Connection Device 265 such that Electronic Device 290 may swivel with respect to the x-axis and y-axis (i.e. axes that are orthogonal to the direction of the user's arm). In an embodiment, Platform 260 is further configured for rotating Electronic Device 290 with respect to three orthogonal axes.

Figure 3:
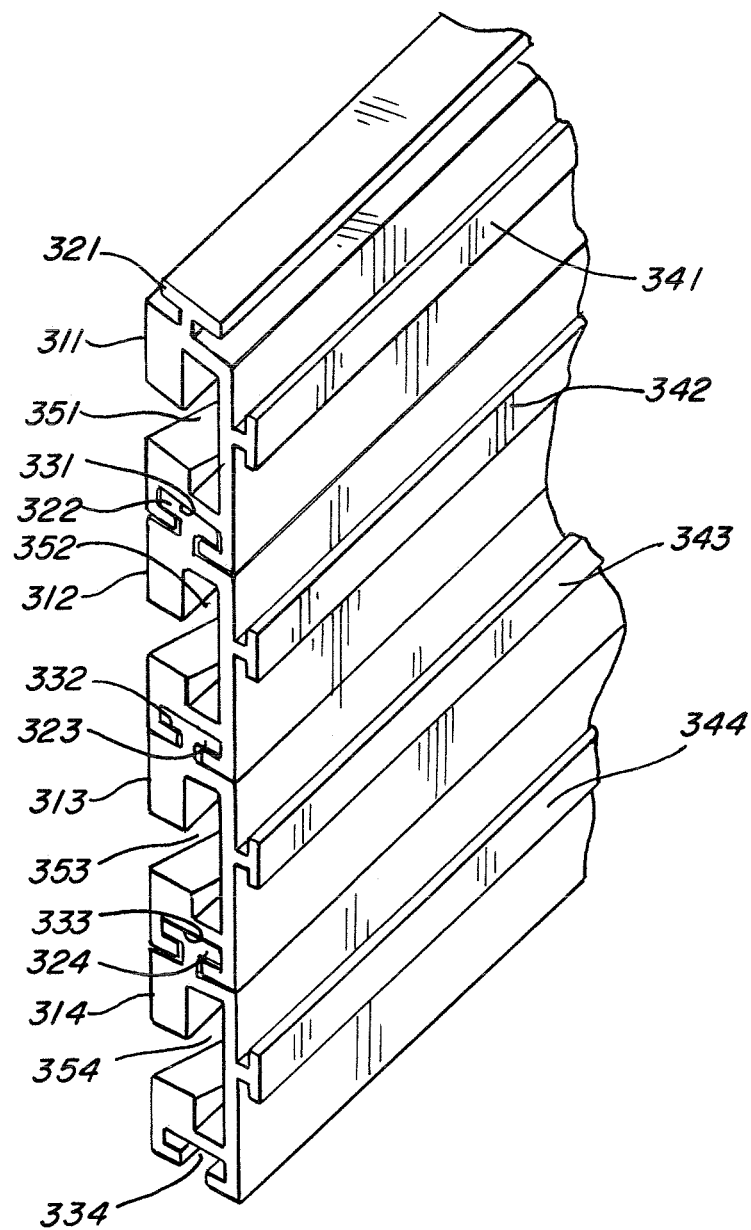
FIG. 3 is a cross-sectional, perspective view of four overlapping adjacent bands.

There are various configurations which enable bands to slidably couple with respect to adjacent bands. In one example, FIG. 3 depicts a cross-sectional view of four overlapping adjacent bands in an embodiment of the invention. Each of the bands (First Band 311, Second Band 312, Third Band 313, and Fourth Band 314) has a ridge or T-shaped extension at the top of the bands (First Band Extension 321, Second Band Extension 322, Third Band Extension 323, and Fourth Band Extension 324) and a band cavity at the bottom of the bands (First Band Cavity 331, Second Band Cavity 332, Third Band Cavity 333, and Fourth Band Cavity 334). The T-Shaped extensions are engaged and captured within the band cavity of an adjacent band which enable the bands to slide relative to an adjacent band while preventing the adjacent bands from separating in a direction transverse to the length of the bands. For example, First Band 311 slides along Second Band 321 as a result of Second Band Extension 322 being loosely captured within first Band Cavity 331. The depiction of the band as having a T-shaped cross-section is for illustration purposes. Any shape of the extension and band cavity which allows the bands to be captured yet slide along adjacent bands is within the spirit of this invention.

Each of the bands also has a corresponding track or T-shaped platform extension along the length of the outer surface (i.e., the outer circumference when the bands are engaged to form a loop) of each band and are depicted as First Platform Extension 341, Second Platform Extension 342, Third Platform Extension 343, and Fourth Platform Extension 344. A platform, such as Platform 260 depicted in FIG. 2A for example, may capture and slide along the platform extensions. The platform extensions allow the platform to move securely along the outside surfaces of the bands.

Figure 4A:
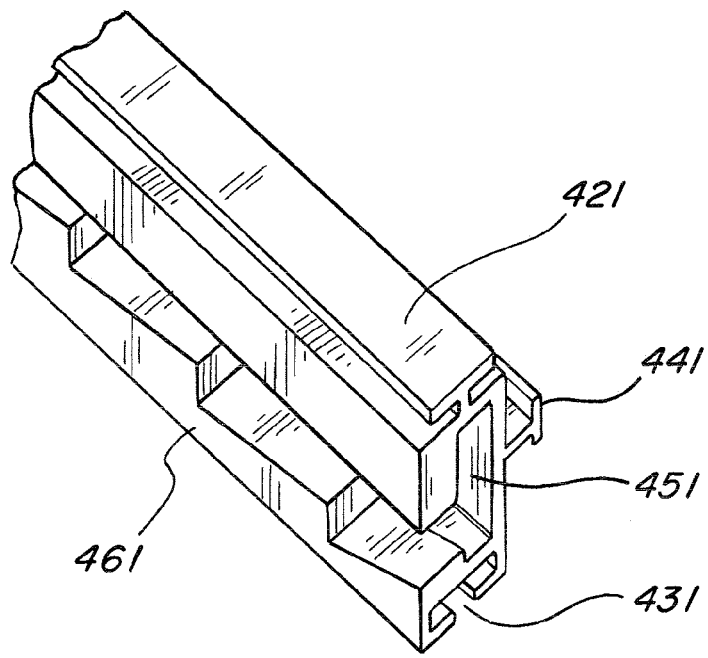
FIG. 4A is a cross-sectional, perspective view of an exemplary band having an internal cavity and a notched channel.

Each of these bands also has an inner cavity depicted by First Inner Cavity 351, Second Inner Cavity 352, Third Inner Cavity 353, and Fourth Inner cavity 354. FIG. 4A illustrates an exemplary band having Inner Cavity 451 and Notched Channel 461. Views of Band Extension 421, Platform Extension 441, and Band Cavity 431 are also presented. In an embodiment, Notched Channel 461 has a profile of a ramped region that extends upward with a modest slope followed by a region in which Notched Channel 461 extends downward with a much greater slope.

Figure 4B:
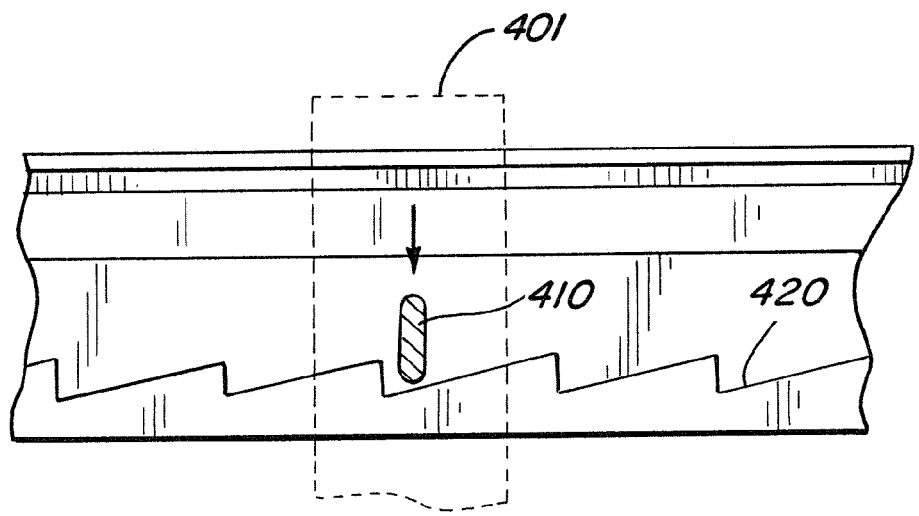
FIG. 4B presents a representation of a ratcheting mechanism having a pawl that locks a band having a notched channel.

FIG. 4B presents a representation of locking mechanism in the form of Ratcheting Mechanism 401 having Pawl 410 that locks a band having Notched Channel 420 along the length of the band. Notched Channel 420 may run the entire length of the bands or may run along one or more regions of the bands. In an embodiment, a downward force urges Pawl 410 against the upper profile of Notched Channel 420. The band moves freely to the left (relative to Ratcheting Mechanism 401) as Pawl 410 moves upward as a result of riding on the ramped region of Notched Channel 420, and then falls when the profile of Notched Channel 410 drops. On the other hand, the band does not move freely to the right as Pawl 410 stops the band once Pawl 410 contacts the steep downward sloped region of Notched Channel 420. However, when Ratcheting Mechanism 401 releases the downward force and lifts Pawl 410, the band may move freely in both directions.

Figure 5:
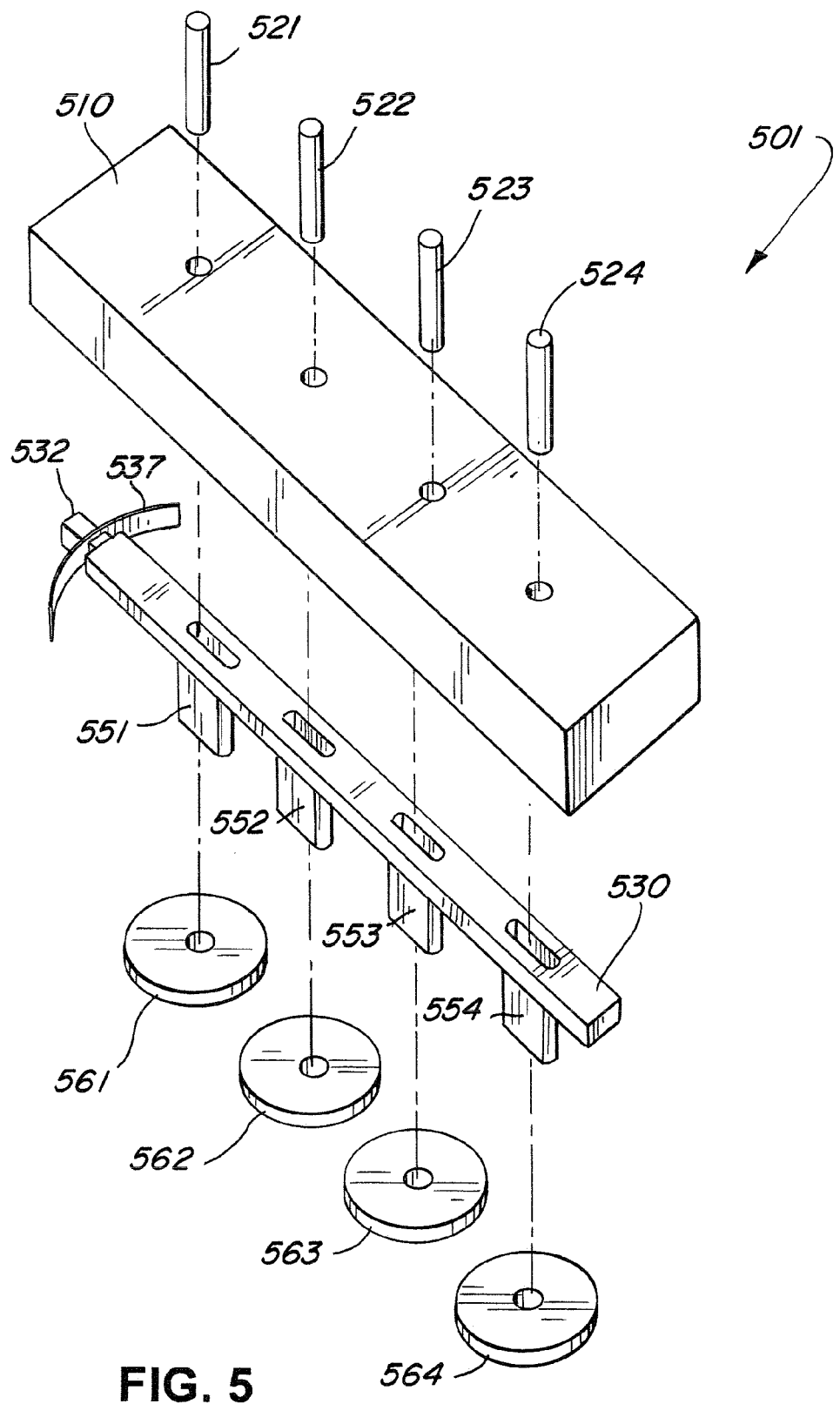
FIG. 5 is an exploded, perspective view of an embodiment of a ratcheting mechanism employing pawls to lock the bands in place.

FIG. 5 is an exploded, perspective view of an embodiment of a locking mechanism comprising a Ratcheting Mechanism 501 employing pawls to lock the bands in place. Case 510 holds Tree 530 having Pawls 551-554, Spring 537, and Release Button 532. One end of Shafts 521-524 affixes to Case 510; the other end slides though the hollowed Pawls 551-554 and attach to corresponding Disk 561-564. Disks 561-564 are placed in the inner cavity of the bands and Pawls 551-554 ride on the notched channel of the bands, as depicted in FIG. 3 for example. Spring 537 engages Pawls 551-554 against the notched channels in the bands. In an embodiment, Pawl 551 is configured for engaging the notched channel of the first band, Pawl 552 is configured for engaging the notched channel of the second band, Pawl 553 is configured for engaging the notched channel of the third band, and Pawl 554 is configured for engaging the notched channel of the fourth band.

When engaged, Pawls 551-554 prevent the expansion of the band but allow for its constriction. By pushing Release Button 532, Spring 537 is compressed. Tree 530 shifts position, disengaging Pawls 551-554, and allows the bands to spring open. When the bands spring open, Ratcheting Mechanism 501 moves to a position near the ends of the four bands. When the bands close, Ratcheting Mechanism 501 move toward the middle of the bands.

Figure 6A:
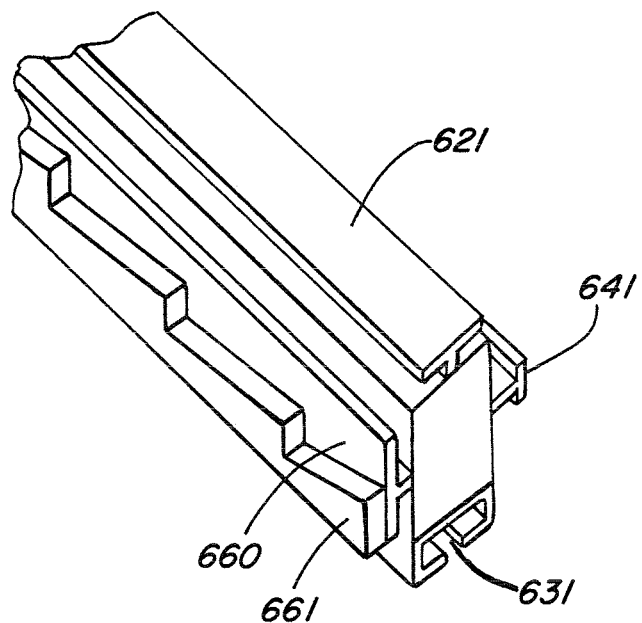
FIG. 6A is a cross-sectional, perspective view of an exemplary band having a notched channel external to the band.
Figure 6B:
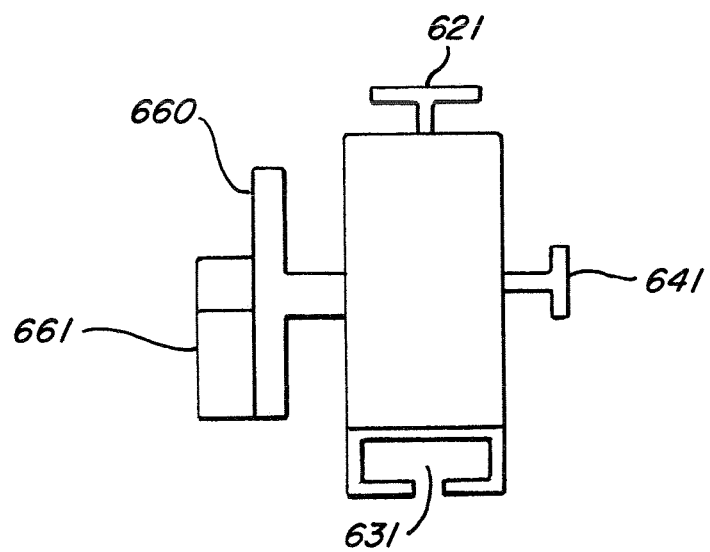
FIG. 6B is a cross-sectional view of an exemplary band having a notched channel external to the band.

Other configurations of the bands and locking mechanisms are also contemplated. In a second embodiment, bands without inner cavities having notched channels are employed. For example, FIGS. 6A and 6B present perspective and cross-sectional views of an exemplary band having Notched Channel 661 that is external to the band. The band has an T-shaped extension that extends along the inner surface (i.e., the surface which is adjacent to a user's arm, for example) that is depicted as Inner Extension 660. Notched Channel 661 is coupled to Inner Extension 660. In an embodiment, a second layer of a fused section may have complementary channels to accommodate the T-shaped extensions when the bands close. The band has Band Extension 621 and Band Cavity 631 which are configured to engage and slide relative to an adjacent band. A platform such as Platform 260 depicted in FIG. 2A may capture and slide along the Platform Extension 641.

Figure 6C:
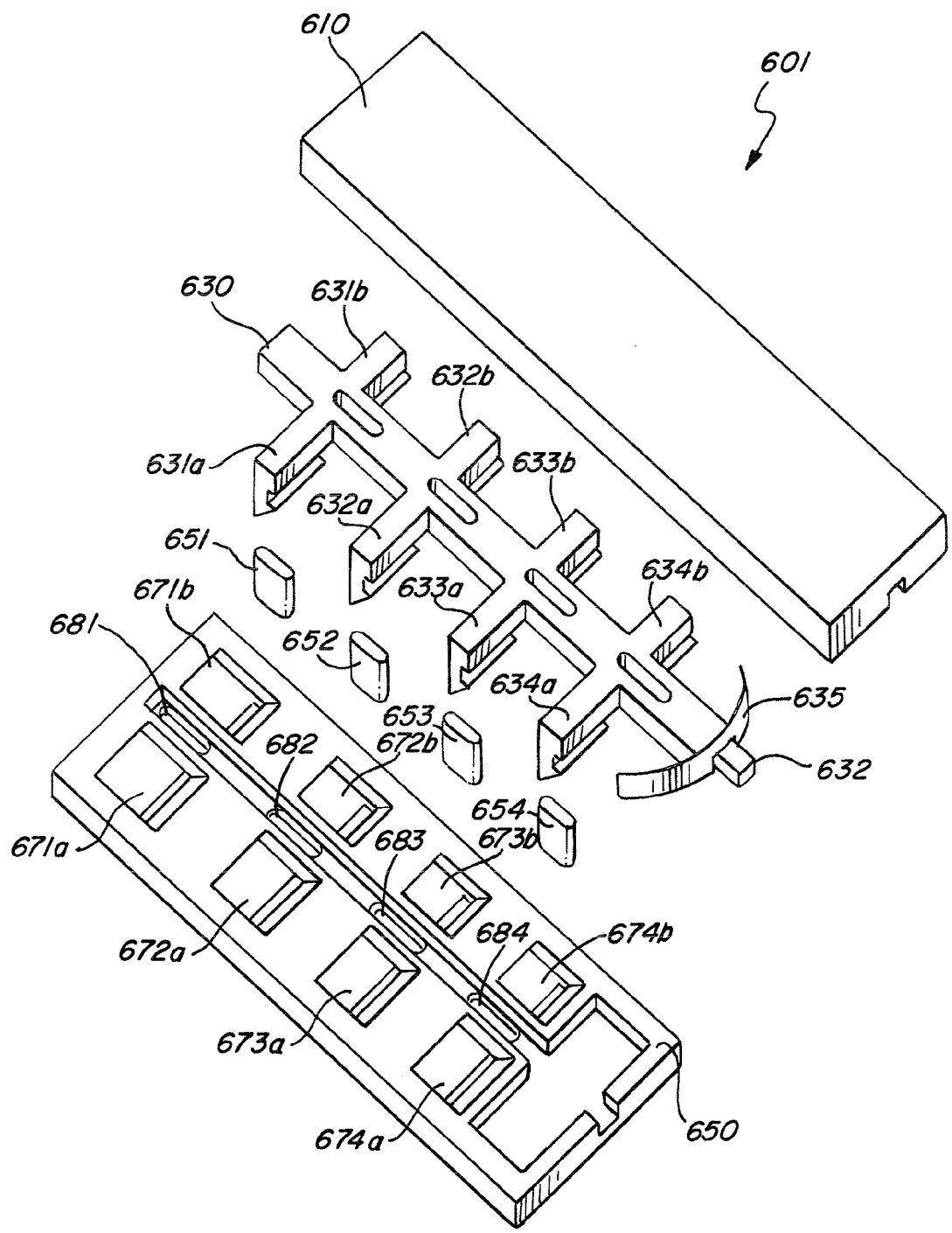
FIG. 6C is an exploded, perspective view of an exemplary ratcheting mechanism.

FIG. 6C is an exploded, perspective view of an exemplary ratcheting mechanism in the form of Ratcheting Mechanism 601 employing Pawls 651-654 to lock the bands in place. Ratcheting Mechanism 601 has Lower Case 650, Tree 630, and Upper Case 610. Lower Case 650 has .four sets of openings designated as Opening 671a, 671b, 672a, 672b, 673a, 673b, 674a, and 674b. The ridges on Openings 671a-674b may attach to one side of Inner Extension 660 as depicted in FIGS. 6A and 6B for example. Lower Case 650 also has Pawl Openings 681-684 that enable Pawls 651-654 to extend through the bottom surface of Lower Case 650 and engage with Notched Channel 661 as depicted in FIGS. 6A and 6B for example.

Tree 630 has four sets of arms designated as Arm 631a, 631b, 632a, 632b, 633a, 633b, 634a, and 634b. Arms 631a-634b may engage with the opposite side of Inner Extension 660 as depicted in FIGS. 6A and 6B for example. Pawls 651-654 are coupled to Tree 630. Spring 635 applies tension to Tree 630, which in turn, urges Arms 631a-634b and Pawls 651-654 to engage with Inner Extension 660 and Notched Channel 661 respectively.

Release Button 632 is positioned at the end of Tree 630. When a user presses Release Button 632, Tree 630 shifts position and releases Arms 631a-634b and Pawls 651-654 from engaging with Inner Extension 660 and Notched Channel 661 respectively.

Figure 7:
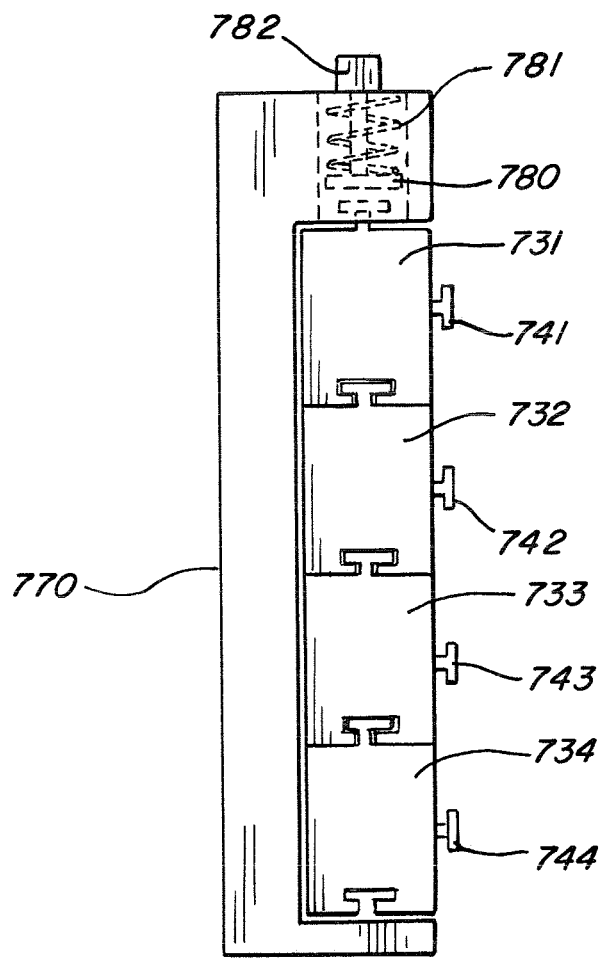
FIG. 7 is a cross-sectional view of an embodiment of a locking mechanism employing a means for pressing the upper band toward the lower band to lock the bands in place.

In a third embodiment, FIG. 7 presents a cross-sectional view of a locking mechanism employing a means for pressing the upper band toward the lower band to lock the bands in place. Locking Mechanism 770 is configured for pressing First Band 731 toward Fourth Band 734 such that First Band 731, Second Band 732, Third Band 733, and Fourth Band 734 are locked in a desired position. In an embodiment, Bands 731-734 are positioned within Locking Mechanism 770. In an embodiment, Piston 780 couples with Spring 781 and applies a downward force against Band 731 which locks Bands 731-734 in place. Release Button 782 is configured to lock and unlock the Bands 731-734. Bands 731-734 have corresponding Platform Extensions 741-744.

Figure 8:
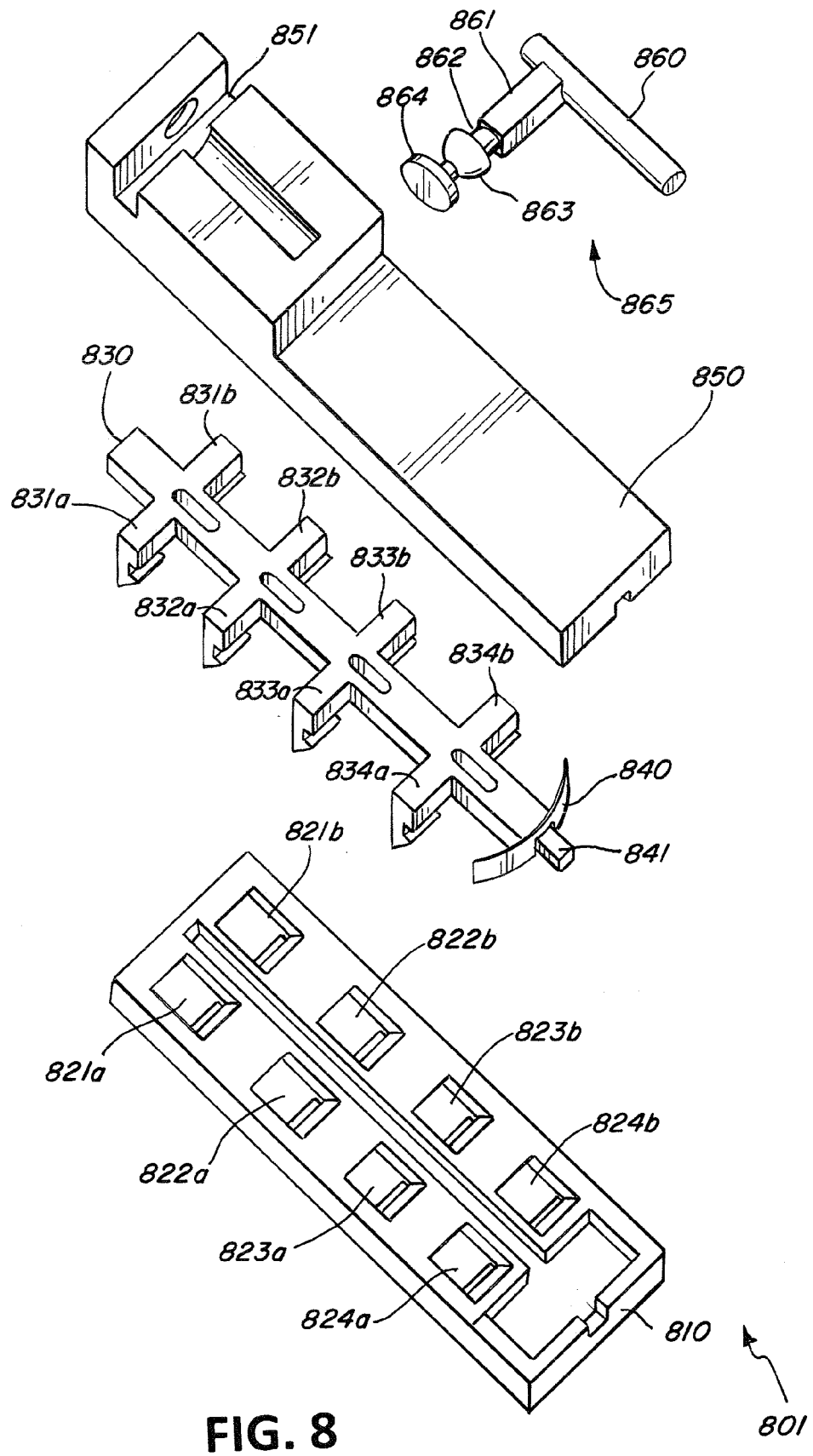
FIG. 8 is an exploded, perspective view of an exemplary platform.
Figure 9B:
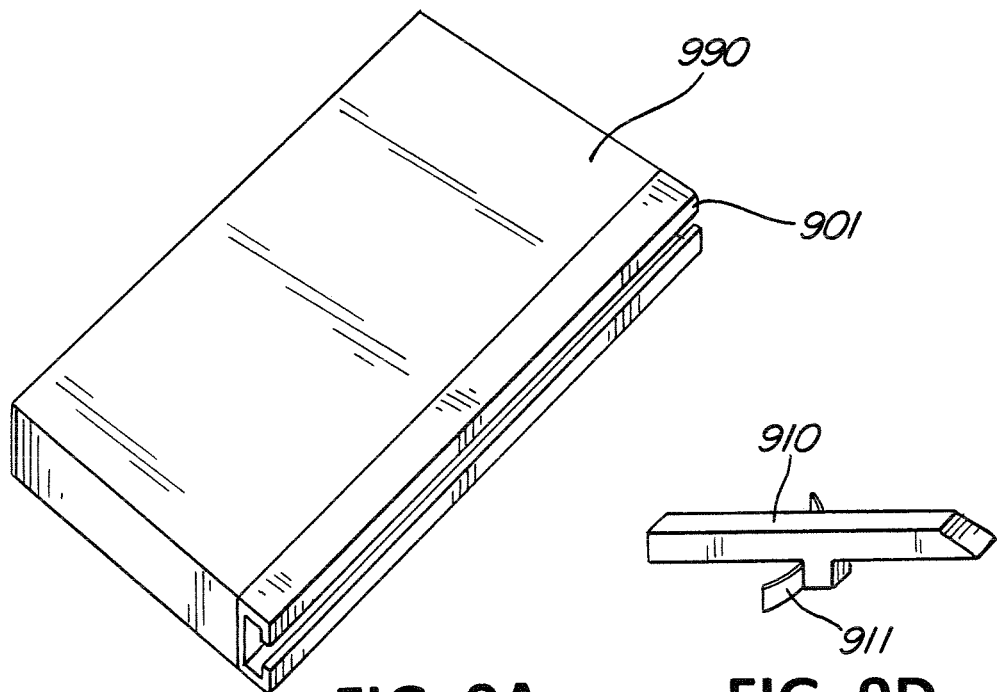
Figure 9B:
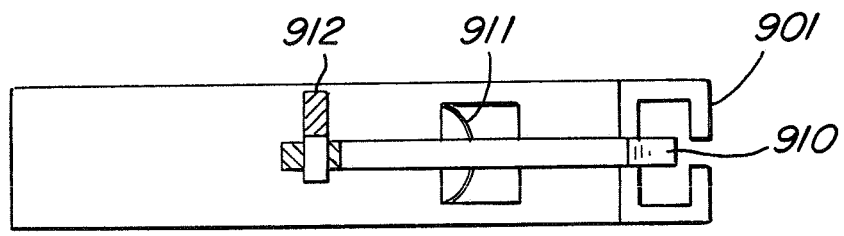
Figure 9C:
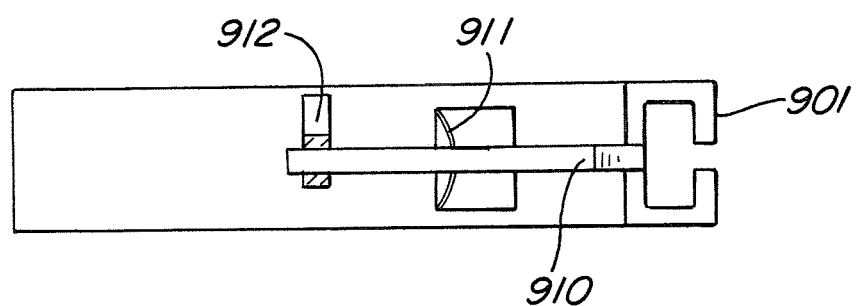

FIG. 8 is an exploded, perspective view of an exemplary platform. Platform 801 connects the four bands (as depicted in FIG. 3 for example) to an electronic device or other object. Platform 801 can be removed from the four bands. Platform 801 can also remain attached to the four bands and move along the platform extensions through the range of diameters of the bands. This enables a user to move a device to a variety of different positions and orientations. Platform 801 is configured for slidably coupling and locking in place to one or more of the track of the first band, the track of the second band, the track of the third band, and the track of the fourth band. In another embodiment, the platform does not lock on the bands. The correct amount of friction and spring tension in the platform allow the user to move the platform with a modest effort, without the need to disengage a lock.

In an embodiment, Platform 801 has Lower Case 810, Tree 830, Upper Case 850, and Ball Joint Bracket 865. Lower Case has four sets of openings with ridges on the bottom surface designated as Opening 821a, 821b, 822a, 822b, 823a, 823b, 824a, and 824b. The ridges on the openings attach to one side of the platform extensions as depicted in FIG. 3 for example.

Tree 830 has four sets of arms designated as Arm 831a, 831b, 832a, 832b, 833a, 833b, 834a, and 834b. These arms attach to the platform extensions on the outer surface of the bands. The arms allow Platform 801 to maintain a moveable but secure connection with either two or four of the bands, depending on the diameter of the bands or where the platform is on the band. Release Button 841 is located at the end of Tree 830. Spring 840 applies tension to Tree 830, which in turn applies tension to the arms which locks Platform 801 in place.

When a user presses Release Button 841, Spring 840 compresses and Arms 831a-834b disengage from the platform extensions. The user can then shift the platform to another position on the band, or remove Platform 801 from the bands.

Upper Case 850 includes Notch 851 to accommodate Ball Joint Bracket 865. Ball Joint Bracket 865 has Rod 860 and Transverse Arm 861 which couples with Notch 851. Transverse Arm 861 is affixed to Ball 862 that is coupled to Ball Socket 863. Ball Socket 863 is coupled to Disk 864 which fits into a channel on one side of an electronic device or other object device. The position of Ball Joint Bracket 865 allows the apparatus to operate without interference from long shirt sleeves or coat sleeves. To maintain a desired position of the electronic device, the ball joint and ball joint bracket move with the correct amount of friction. The assembly can shift in response to a collision, thereby lessening damage to the electronic device and minimizing any potential injury.

FIGS. 9A-9D present an electronic device carrier in an embodiment of the present invention. Disk 864 (as depicted in FIG. 8) fits into Channel 901 on one side of Device 990. In an embodiment of the invention, Channel 901 may be built into the original manufacturer's case, or it can be part of an accessory "bumper" or case. Channel 901 may be placed on an edge of Device 990 or extend from the back of Device 990.

At one end of Channel 901, a simple mechanism allows the user to control its opening and closing. The user moves Sliding Lock 912 to the unlock position which allows the user to change the position of Post 910 that obstructs the opening to Channel 901. Spring 911 is attached to Post 910 and maintains this position of the obstruction. The tip of the post has a wedged shape so that the disk can be inserted into Channel 901 easily. Disk 864 can be removed by sliding Sliding Lock 912 to the unlock position and then pushing Post 910 in the direction that compresses Spring 911.

Figure 10A:
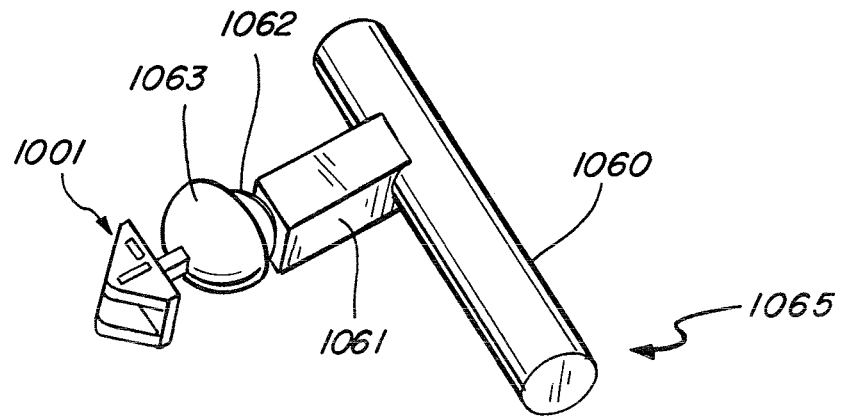
FIG. 10A is a perspective view of an exemplary ball joint bracket having a device coupling mechanism

Other means for coupling a platform to an electronic device are contemplated. For example, FIG. 10A is a perspective view of an exemplary Ball Joint Bracket 1065 having Device Coupling Mechanism 1001. Rod 1060 and Transverse Arm 1061 of Ball Joint Bracket 1065 may couple with a platform such as Platform 801 as depicted in FIG. 8 for example. Device Coupling Mechanism 1001 is affixed to Ball Socket 1063 which is coupled to Ball 1062. In an embodiment, Device Coupling Mechanism 1001 eliminates the need for springs, locks, and buttons on the edges of devices and can be positioned to any location along the edge of a device.

Figure 10B:
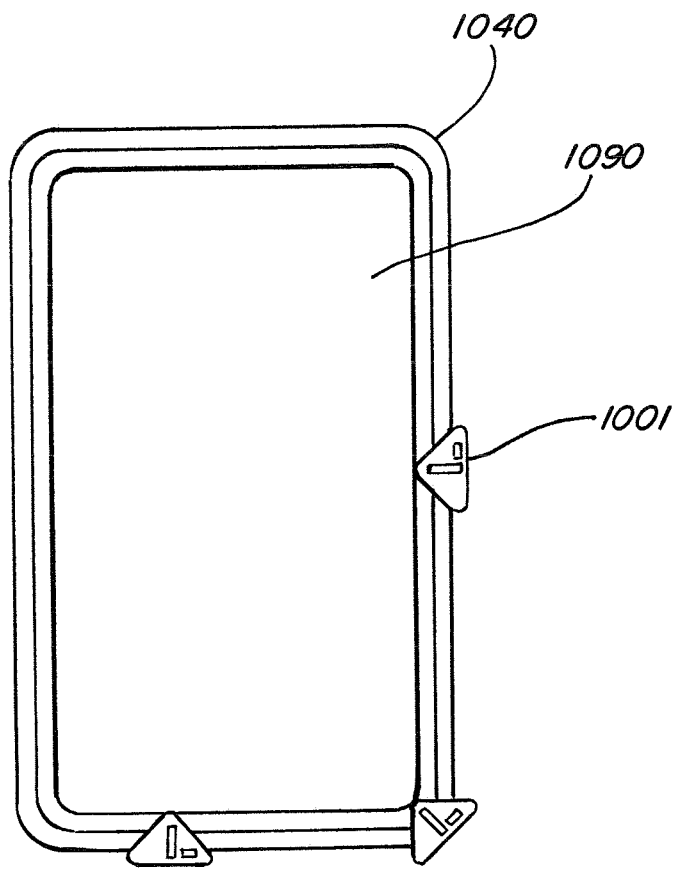
FIG. 10B is a top view depicting the device coupling mechanism sliding along and attaching to an electronic device.

FIG. 10B is a top view depicting Device Coupling Mechanism 1001 sliding along and attaching to Device 1090 via Device Outer Perimeter 1040. Device Outer Perimeter 1040 has a series of channels that enable Device Coupling Mechanism 1040 to slide along and attach to Device 1090. Device Outer Perimeter 1040 may be formed in Device 1090, or may be formed in a case that holds Device 1090. Device Coupling Mechanism 1001 may slide along the entire perimeter of Device 1090 and then be locked in place by the user.

Figure 10C:
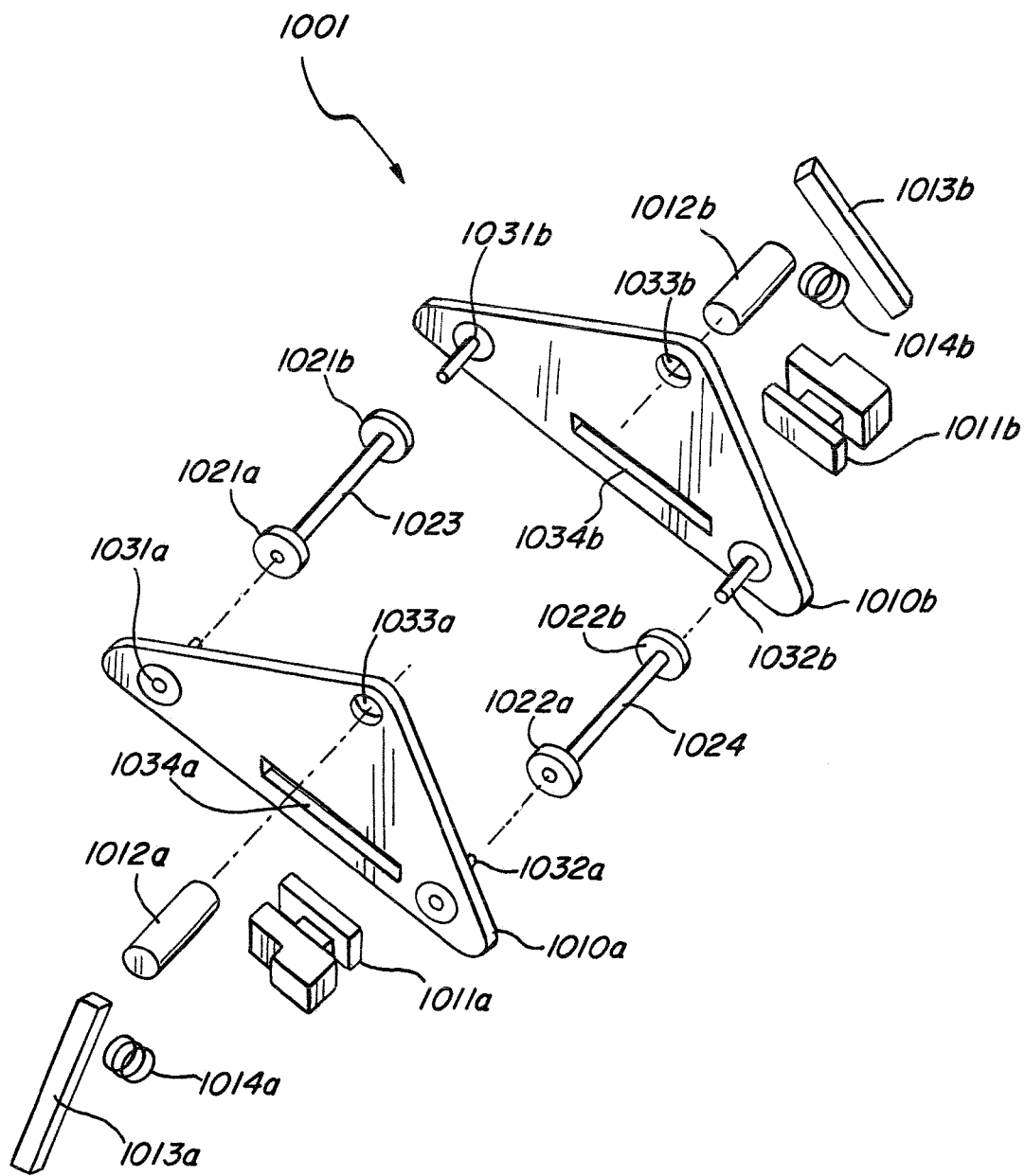
FIG. 10C is an exploded, perspective view of the device coupling mechanism.

FIG. 10C is an exploded, perspective view of the Device Coupling Mechanism 1001. Device Coupling Mechanism 1001 has Plates 1010a and 1010b each of which has Locking Pin Openings 1033a and 1033b, and Mounting Shafts 1031a, 1032a, 1031b, and 1032b. Wheels 1021a and 1021b are coupled via Shaft 1023; and Wheels 1022a and 1022b are coupled via Shaft 1024. Plates 1010a and 1010b are coupled by Wheel 1021a coupling to Mounting Shaft 1031a, Wheel 1022a coupling to Mounting Shaft 1032a, Wheel 1021b coupling to Mounting Shaft 1031b, and Wheel 1022b coupling to Mounting Shaft 1032b. One end of Arm 1013a and 1013b couples to Locking Pins 1012a and 1012b, respectively. The opposite ends of Arms 1013a and 1013b couples to Pivoting Members 1011a and 1011b, respectively. Springs 1014a and 1014b apply tension to Arms 1013a and 1013b respectively.

Figure 10D:
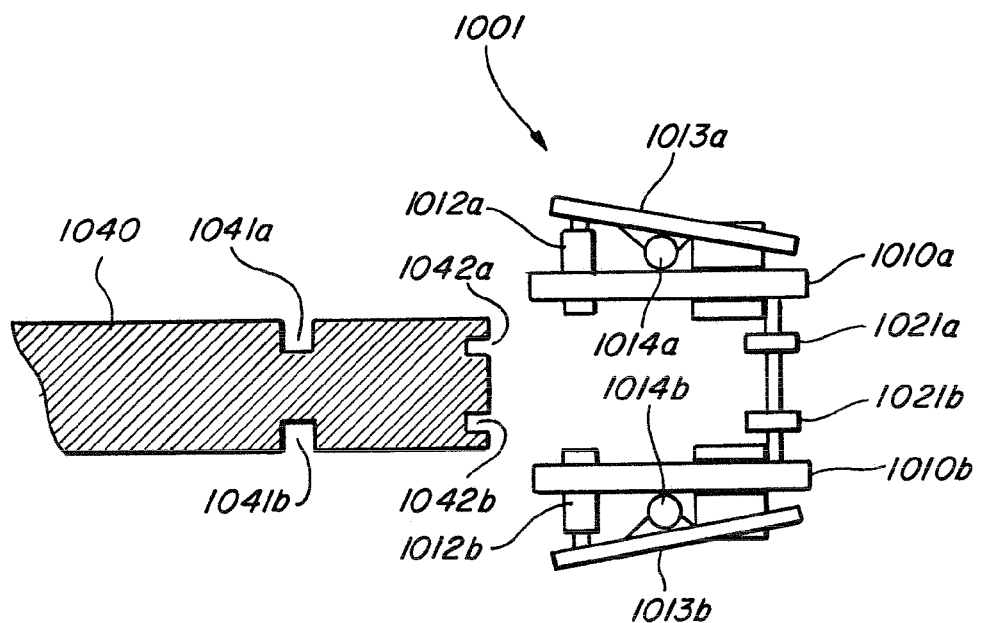
FIG. 10D is a cross-sectional view of the device coupling mechanism and the outer section of an electronic device case.
Figure 10E:
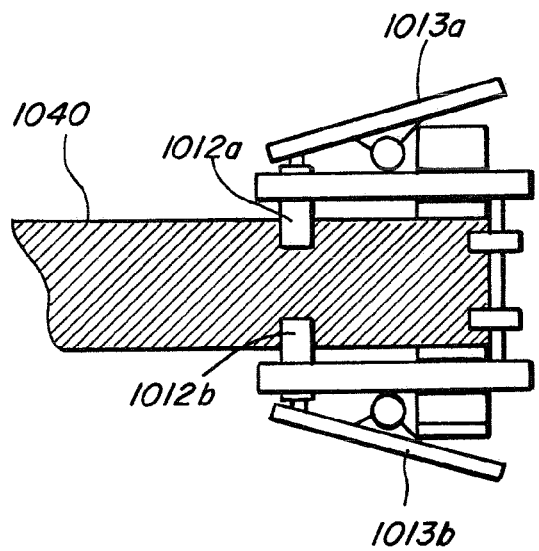
FIG. 10E is a cross-sectional view of the device coupling mechanism engaging with the outer section of the electronic device case.

FIGS. 10D and 10E are cross-sectional views of the Device Coupling Mechanism 1001 and Device Outer Perimeter 1040 of an electronic device case. Device Outer Perimeter 1040 has Channels 1041a, 1041b, 1042a, and 1042b. Channels 1042a and 1042b are configured to align with and serve as tracks for Wheels 1021a and 1021b respectively. In an embodiment, Device Coupling Mechanism 1001 may couple to Outer Perimeter 1040 with other means having low friction such that Device Coupling Mechanism 1001 freely slides on Device Outer Perimeter 140. Locking Pins 1012a and 1012b extend through Locking Pin Openings 1033a and 1033b.

Locking Pins 1012a and 1012b are configured to be placed in one of three positions. FIG. 10D depicts a first position and shows a cross-sectional view depicting Locking Pins 1012a and 1012b retracted to allow Device Coupling Mechanism 1001 to detach and be removed from Device Outer Perimeter 1040.

FIG. 10E depicts Locking Pins 1012a and 1012b in a second position and shows Device Coupling Mechanism 1001 engaging with Device Outer Perimeter 1040. In the second position, Locking Pins 1012a and 1012b partially extend into Channels 1041a and 1041b such that Device Coupling Mechanism is attached but may freely slide along Channels 1041a and 1041b. In the third position, Locking Pins 1012a and 1012b securely captures Channels 1041a and 1041b such that Device Coupling Mechanism 1001 is unable to slide with respect to Outer Perimeter 1040.

Figure 11A:
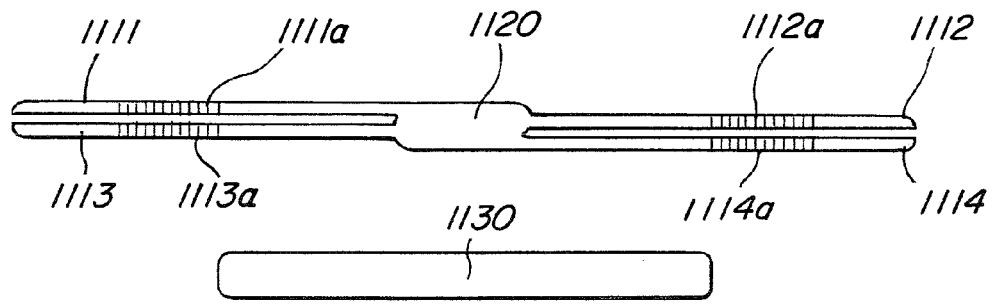
FIGS. 11A-11C are top views of embodiments with bands having a second layer to the fused section.
Figure 11B:
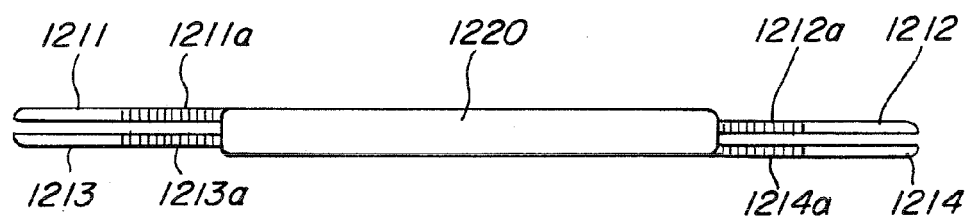
Figure 11C:
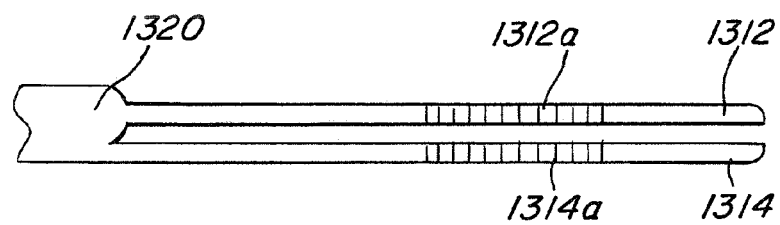
Figure 11C:
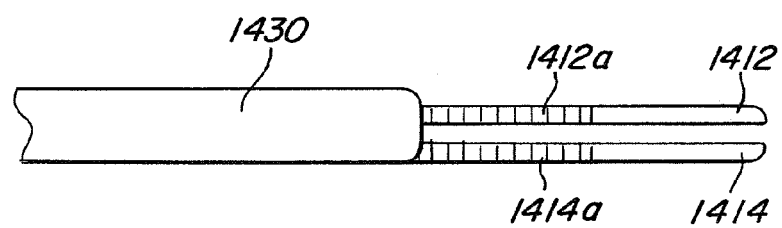

FIGS. 11A-11C present embodiments having bands having a second layer to the fused section. FIGS. 11A-11C depict the bands and fused section as flattened for clarity. FIG. 11A presents a First Fused Section 1120 having bands 1111, 1112, 1113, and 1114 having notched channels depicted by 1111a, 1112a, 1113a, and 1114a respectively. Second Fused Section 1130 has a length comparable to the distance from Notched Channels 1111a and 1113a to Notched Channels 1112a and 1114a.

FIG. 11B depicts Second Fused Section 1220 having Bands 1211, 1212, 1213, and 1214 with Notched Channels 1211a, 1212a, 1213a, and 1214a. The length of Second Fused Section 1220 is comparable with the distance from Notched Channels 1111a and 1113a to Notched Channels 1112a and 1114a.

FIG. 11C depicts the right-hand-side of First Fused Section 1320 having bands 1312 and 1314 with Notched Channels 1312a and 1314a respectively. Second Fused Section 1430 has bands 1412 and 1414 with Notched Channels 1412a and 1414a respectively.

Second Fused Sections 1130, 1220, and 1430 form a surface on the inside of the bands on which cushions, pads, and sensors may be mounted. Approximately one half the length of the bands would make up most of the outer layer of Second Fused Sections 1130, 1220, and 1430 which renders the bands much more stable in the open position.

Although the invention has been discussed with reference to specific embodiments, it will be apparent that the concept can be otherwise embodied to achieve the advantages discussed. The present invention has been described primarily as a wearable assembly having a locking mechanism and a platform. In this regard, the foregoing description of the wearable assembly is present for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

The invention claimed is:

1. A wearable assembly for carrying a device comprising:
   a first band having a length substantially transverse to an axis, wherein one end of the first band is located near the axis and the opposing end of the first band extends away in a first direction;
   a second band positioned adjacent to the first band, wherein one end of the second band is located near the axis and coupled to said one end of the first band and the opposing end of the second band extends away in a second direction that is opposite to the first direction;
   a third band positioned adjacent to the second band, wherein one end of the third band is located near the axis and coupled to said one end of the second band, wherein the opposing end of the third band extends away in the first direction;
   a fourth band positioned adjacent to the third band, wherein one end of the fourth band is located near the axis and coupled to said one end of the third band, wherein the opposing end of the fourth band extends away in the second direction;
   wherein each band of the first band, the second band, the third band, and the fourth band further comprises:
   a track along the length of the outer surface of each band,
   a notched channel along the length of each band,
   a ridge along the length of the top surface of each band, and,
   a groove along the length of the bottom surface of each band, wherein the groove is configured for engaging and slidably coupling the ridge of an adjacent band.

2. The wearable assembly of claim 1, further comprising a ratcheting mechanism configured for locking the opposing ends of the first, second, third, and fourth bands at a desired position, wherein the ratcheting mechanism further comprises:
   a first pawl configured for engaging the notched channel of the first band,
   a second pawl configured for engaging the notched channel of the second band,
   a third pawl configured for engaging the notched channel of the third band, and
   a fourth pawl configured for engaging the notched channel of the fourth band.

3. The wearable assembly of claim 2, further comprising a platform configured for slidably coupling and locking in place to one or more of the track of the first band, the track of the second band, the track of the third band, and the track of the fourth band.

4. The wearable assembly of claim 3, wherein the platform further comprises a plurality of arms configured for engaging and locking the platform to one or more of the track of the first band, the track of the second band, the track of the third band, and the track of the fourth band.

5. The wearable assembly of claim 4, wherein the platform is further configured for coupling with a device.

6. The wearable device of claim 5, wherein the platform is further configured for rotating the device with respect to three orthogonal axes.

7. The wearable device of claim 6, wherein the platform further comprises a ball and socket assembly configured for rotating the device with respect to the three orthogonal axes.

8. The wearable device of claim 7, wherein the ball and socket assembly further comprises a device coupling mechanism comprising:
   a plurality of wheels configured for rolling along the perimeter of the device; and,
   a locking pin mechanism configured for operating in three modes, wherein a first mode allows the device coupling mechanism to decouple from the device, wherein a second mode allows the device coupling mechanism to attach to and freely slide along the perimeter of the device, and wherein a third mode that securely attaches the device coupling mechanism to the device.

9. The wearable device of claim 7, wherein the each band of the first band, the second band, the third band, and the fourth band further comprises an internal cavity having the notched channel.

10. The wearable device of claim 7, wherein the each band of the first band, the second band, the third band, and the fourth band further comprises an inner track along the length of the inner surface having the notched channel.

11. A wearable assembly for carrying a device comprising:
    a first band having a length substantially transverse to an axis, wherein one end of the first band is located near the axis and the opposing end of the first band extends away in a first direction;
    a second band positioned adjacent to the first band, wherein one end of the second band is located near the axis and coupled to said one end of the first band and the opposing end of the second band extends away in a second direction that is opposite to the first direction;
    a third band positioned adjacent to the second band, wherein one end of the third band is located near the axis and coupled to said one end of the second band, wherein the opposing end of the third band extends away in the first direction;

a fourth band positioned adjacent to the third band, wherein one end of the fourth band is located near the axis and coupled to said one end of the third band, wherein the opposing end of the fourth band extends away in the second direction;

wherein the opposing ends of the first, second, third, and fourth bands are configured for engaging and slidably coupling with respect to adjacent bands, each band of the first band, the second band, the third band, and the fourth band further comprising:

a ridge along the length of the top surface of each band, and, a groove along the length of the bottom surface of each band, wherein the groove is configured for engaging and slidably coupling the ridge of an adjacent band.

12. The wearable assembly of claim 11, further comprising a mechanism configured for locking the opposing ends of the first, second, third, and fourth bands.

13. The wearable assembly of claim 12, further comprising a platform configured for slidably coupling and locking in place to one or more of said first, second, third, and fourth bands.

14. The wearable assembly of claim 12,
wherein the groove of the first band further comprises a first notched channel along the length of the first band,
wherein the groove of the second band further comprises a second notched channel along the length of the second band,
wherein the groove of the third band further comprises a third notched channel along the length of the third band, and,
wherein the groove of the fourth band further comprises a fourth notched channel along the length of the fourth band.

15. The wearable assembly of claim 14, wherein the mechanism for locking further comprises a mechanism further comprising:
a first pawl configured for engaging the first notched channel;
a second pawl configured for engaging the second notched channel;
a third pawl configured for engaging the third notched channel; and,
a fourth pawl configured for engaging the fourth notched channel.

16. A wearable assembly for carrying a device comprising:
at least one band of a first type having a length substantially transverse to an axis, wherein one end of said at least one band of a first type is located near the axis and the opposing end of said at least one band of a first type extends away in a first direction;
at least one band of a second type having a length substantially transverse to the axis, wherein one end of said at least one band of a second type is coupled to an adjacent band of the first type and the opposing end of said at least one band of the second type extends away in a second direction that is opposite to the first direction;
wherein the opposing ends of said at least one band of the first type and said at least one band of the second type are configured for engaging and slidably coupling with respect to adjacent bands, each at least one band of the first type and each at least one band of the second type further comprising:
a ridge along the length of the top surface of each band, and,
a groove along the length of the bottom surface of each band, wherein the groove is configured for engaging and slidably coupling the ridge of an adjacent band.

17. The wearable assembly of claim 16, further comprising:
a mechanism configured for locking the opposing ends of said at least one band of the first type and said at least one band of the second type; and,
a platform configured for slidably coupling and locking in place to one or more of said at least one band of the first type and said at least one band of the second type, wherein the platform is further configured for coupling with a device.

* * * * *